US009995274B2

(12) United States Patent
Knoop et al.

(10) Patent No.: US 9,995,274 B2
(45) Date of Patent: Jun. 12, 2018

(54) METHOD AND DEVICE FOR MOUNTING A ROTOR HUB ON A WIND TURBINE

(71) Applicant: Wobben Properties GmbH, Aurich (DE)

(72) Inventors: Frank Knoop, Aurich (DE); Gerrit Kuiper, Aurich (DE)

(73) Assignee: Wobben Properties GmbH, Aurich (DE)

( * ) Notice: Subject to any disclaimer, the term of this patent is extended or adjusted under 35 U.S.C. 154(b) by 363 days.

(21) Appl. No.: 14/372,159

(22) PCT Filed: Dec. 18, 2012

(86) PCT No.: PCT/EP2012/076021
§ 371 (c)(1),
(2) Date: Jul. 14, 2014

(87) PCT Pub. No.: WO2013/110417
PCT Pub. Date: Aug. 1, 2013

(65) Prior Publication Data
US 2014/0341742 A1 Nov. 20, 2014

(30) Foreign Application Priority Data
Jan. 25, 2012 (DE) .................. 10 2012 201 088

(51) Int. Cl.
| F03D 1/06 | (2006.01) |
| B66C 1/10 | (2006.01) |
| B23P 15/04 | (2006.01) |
| F03D 13/10 | (2016.01) |

(52) U.S. Cl.
CPC ............ *F03D 1/0691* (2013.01); *B23P 15/04* (2013.01); *B66C 1/108* (2013.01); *F03D 13/10* (2016.05); *Y02E 10/721* (2013.01); *Y02E 10/726* (2013.01); *Y10T 29/4932* (2015.01)

(58) Field of Classification Search
CPC ............................. F03D 1/001; B66C 1/108
See application file for complete search history.

(56) References Cited

U.S. PATENT DOCUMENTS

| 7,161,259 B2 | 1/2007 | Lagerwey |
| 8,083,212 B2 | 12/2011 | Numajiri et al. |
| 8,807,611 B2 | 8/2014 | Lülker |
| 8,961,085 B2 | 2/2015 | Ressel et al. |

(Continued)

FOREIGN PATENT DOCUMENTS

| CL | 201000043 A1 | 1/2010 |
| DE | 10 2007 062 428 A1 | 6/2009 |

(Continued)

*Primary Examiner* — Richard Edgar
*Assistant Examiner* — Michael Sehn
(74) *Attorney, Agent, or Firm* — Seed Intellectual Property Law Group LLP

(57) ABSTRACT

The invention concerns a rotor hub of a wind power installation comprising a handling apparatus for lifting the rotor hub by means of a crane for mounting the rotor hub to a pod arranged on a wind power installation pylon, wherein the handling apparatus is so adapted that upon being lifted at a fixing portion of the handling apparatus the rotor hub rotates from a perpendicular orientation with a substantially perpendicular hub axis into a horizontal orientation with a substantially horizontal hub axis.

14 Claims, 3 Drawing Sheets

(56) References Cited

U.S. PATENT DOCUMENTS

| | | | |
|---|---|---|---|
| 2009/0159549 A1 | 6/2009 | Trede et al. | |
| 2009/0280010 A1* | 11/2009 | Pederson | B66F 3/46 416/1 |
| 2009/0324380 A1* | 12/2009 | Pedersen | F03D 1/001 414/800 |
| 2011/0220538 A1 | 9/2011 | Nies | |
| 2013/0045110 A1* | 2/2013 | Wagner | B66C 1/108 416/244 R |

FOREIGN PATENT DOCUMENTS

| | | | | |
|---|---|---|---|---|
| DE | 202010004093 U1 | 6/2011 | | |
| EP | 2 072 812 A2 | 6/2009 | | |
| JP | 2003-510492 A | 3/2003 | | |
| JP | 2009-2206 A | 1/2009 | | |
| WO | 2008/000267 A1 | 1/2008 | | |
| WO | 2008/089763 A2 | 7/2008 | | |
| WO | 2001/026970 A2 | 3/2011 | | |
| WO | WO 2011026970 A2 * | 3/2011 | ............. | B66C 1/108 |
| WO | 2011/124574 A1 | 10/2011 | | |

\* cited by examiner

METHOD AND DEVICE FOR MOUNTING A ROTOR HUB ON A WIND TURBINE

BACKGROUND

Technical Field

The present invention concerns a rotor hub of a wind power installation and a handling apparatus for handling the rotor hub, and the invention further concerns a method of handling, in particular mounting, a rotor hub of a wind power installation.

Description of the Related Art

Rotor hubs of wind power installations are known, they carry one or more, in particular three, rotor blades and together with the rotor blades essentially form a rotor of the wind power installation. The rotor hub and thus such an assembled rotor are mounted to a pod rotatably about a rotor axis. Depending on the respective structure the rotor hub can be interpreted as part of the pod and is accordingly mounted rotatably to a pod portion. In particular the present invention relates to so-called horizontal-axis wind power installations in which the rotor axis is arranged substantially horizontally. In that respect slightly tilted positions of the rotor axis relative to the horizontal are not an important consideration. Such a wind power installation is diagrammatically shown in FIG. 1.

The operation of mounting a wind power installation of such a type, in particular when it involves a larger structure, includes the step of mounting a rotor hub to a pod or pod portion which is already mounted on a pylon or mast. For that purpose the rotor hub is usually delivered with the hub axis perpendicular, at the place of erection of the wind power installation. For example the hub can be delivered on a flat-bed truck.

For the mounting operation the hub or rotor hub, these being considered hereinafter as equivalent terms, is lifted and then has to be rotated in such a way that the hub axis is changed from its perpendicular orientation into an approximately horizontal orientation. In that respect it is to be noted that such a hub of a modern wind power installation can weigh many metric tons, often over 30 t or over 50 t. That rotating operation is thus not a simple task. If rotation of the hub is effected in the proximity of the ground or the flat-bed truck there is the risk that damage, in particular to casing elements of the hub, can occur, due to the rotation.

To avoid such damage the hub is entirely or partially produced without casing elements. Another or supplemental option involves already delivering the hub with the hub axis oriented horizontally. That however required a high level of complication and expenditure in reliably positioning and fixing the hub on the transport vehicle in such an orientation. Frequently in that case the hub is not designed to itself carry its own weight in a position with the hub axis oriented horizontally, when it is not fitted to the pod, but is placed on a vehicle or the like.

In principle a pod can also be transported to the place of erection, with the hub installed. Such solutions however are scarcely practicable or even impossible for larger wind power installations such as for example with a nominal power output of 1 megawatt or more. In particular in that case the total weight of the pod with hub and thus also with the generator is frequently so great that it is difficult to transport and it is also particularly difficult to lift it to the desired height with a crane. Added to that is the fact that the size of such a finished pod raises problems in on-road transport. Particularly in the case of gearless wind power installations and here in particular with the above-indicated size, this often involves a structural size which is unsuitable for on-road transport.

The German Patent and Trade Mark Office searched the following state of the art in the priority application: DE 10 2007 062 428 A1.

BRIEF SUMMARY

One or more embodiments of the present invention may address at least one of the specified problems. In particular one embodiment provides a solution for improving the erection of a wind power installation, in particular handling of a hub of a wind power installation. At least one embodiment of the invention seeks to provide an alternative solution.

According to one embodiment there is proposed a rotor hub intended for a wind power installation that is equipped with a handling apparatus for lifting the rotor hub by means of a crane. In that respect the handling apparatus is provided for lifting and mounting the rotor hub to a pod arranged on a wind power installation pylon. In that respect it is so adapted that the rotor hub upon being lifted when it is lifted at a fixing portion of the handling apparatus is moved from a perpendicular orientation into a horizontal orientation. In that respect a perpendicular orientation involves an orientation in which the hub axis is substantially perpendicular and a horizontal orientation is one in which the hub axis is substantially horizontal.

In particular the rotor hub rotates from its perpendicular orientation into the horizontal orientation upon being lifted from the ground, flat-bed truck or other supports. In that case the rotary movement is such that the rotor hub does not suffer any damage in that situation.

In that case the handling apparatus is fixedly connected to the rotor hub so that the rotor hub can be lifted at same, namely at the fixing portion of the handling apparatus, and in that way the described rotary movement is guided, that is to say guided by the handling apparatus.

Preferably the rotor hub has at least blade connection for fixing a rotor blade thereto. In that case fixing of the rotor blade can be effected directly or indirectly, for example by way of an interposed blade adaptor. For that purpose the blade connection has a ring flange and the fixing portion of the handling apparatus is so arranged in or at the rotor hub that, for lifting and rotating the rotor hub from the perpendicular orientation into the horizontal orientation, a lifting unit of a crane is fixed through the rotor blade opening to the fixing portion. For that purpose the fixing portion is suitably fixed to the rotor hub by means of the handling apparatus, in particular the fixing portion being fixed to the blade connection. The lifting unit, which in the simplest case can be a crane hook with corresponding crane cable or corresponding crane chain, extends suitably perpendicularly from the crane to the lifting portion and in that case otherwise does not touch the rotor hub or does not substantially touch it. In the lifting operation, when the rotor hub rotates from the perpendicular orientation into the horizontal orientation, the lifting unit substantially equally little comes into contact with the rotor hub so that the rotary movement is not impeded and damage to the rotor hub due to coming into contact with the lifting unit is avoided. In particular the lifting unit is not diverted from the fixing portion by other components of the rotor hub, in particular not by the ring flange. More specifically, in such a case the force to the weight of the hub would be at least partially transmitted by way of the lifting unit of the crane to the corresponding location on the ring flange, and that could result in damage.

In that respect the rotor hub preferably has a hub casing which has at least one rotor blade opening for a rotor blade to pass therethrough. In particular there are three rotor blade openings for three rotor blades of a wind power installation having three rotor blades. Accordingly such a rotor blade opening of the hub casing is associated with a respective blade connection and thus the respective ring flange. Accordingly the rotor blade opening is so provided that a rotor blade or a blade adaptor is passed through the opening to the blade connection and is fixed there. For lifting the rotor hub alone, namely without rotor blades, it is proposed that a portion of the handling apparatus, namely the fixing portion thereof, is fixed to one of the blade connections and the rotor hub is lifted thereat. In that case the fixing portion can project through the rotor blade opening in question in the hub casing or a lifting unit of the crane extends at least partially through the rotor blade opening to the fixing portion. At any event finally there is a connection between the crane and the rotor hub through that rotor blade opening. In that case the lifting unit does not come into contact with the hub casing either in the horizontal orientation or in the perpendicular orientation of the rotor hub and also not in the transitional region therebetween when the rotor hub is rotated from the perpendicular into the horizontal orientation.

Preferably there is provided a pre-mounting support frame for carrying the rotor hub in the perpendicular orientation thereon with a hinge portion for guiding the rotary movement of the rotor hub from the perpendicular orientation into the horizontal orientation. That pre-mounting support frame is provided in particular as part of the handling apparatus. The hinge portion acts as or provides a pivot axis so that the hub can rotate about that pivot axis of the hinge portion while it is being lifted. At the same time rotation occurs at the fixing portion. At the same time the rotor hub is supported in the rotary movement at the hinge portion on a support which can be part of the pre-mounting support frame and/or can be connected to the pre-mounting support frame by way of the hinge portion. Desirably a part of the handling apparatus is released from the rotor hub as soon as the rotor hub has reached its horizontal orientation on being lifted and is hanging completely or almost completely from the crane.

Preferably the pre-mounting support frame is fixed to a ring flange which is arranged concentrically relative to the hub axis and at which the hub is to be connected to the rotor of a generator upon being mounted to the pod. For that reason that ring flange is referred to hereinafter as the generator rotor flange. That generator rotor flange is thus provided, in its regular mode of use in the wind power installation, for connecting the hub including rotor blades fixed thereto to a generator rotor so that the generator rotor carries the weight of the hub with mounted rotor blades, that is to say the weight of the entire rotor, thereon. In that way the pre-mounting support frame can carry the hub at that generator rotor flange and is thus fixed thereto.

Preferably the rotor hub is adapted for being fixedly connected to a generator rotor of a generator of a gearless wind power installation. The rotor hub is therefore adapted to a gearless wind power installation. Accordingly the hub is not intended in connection with a rotor shaft for connection to a gear transmission, but is intended for direct connection to the generator rotor. That has consequences in regard to the design configuration of the hub, in particular the above-described generator rotor flange reflects such a connection in a gearless wind power installation. In addition transport with the hub axis horizontal is difficult in particular for such a rotor hub and instead perpendicular transport is advantageous, in which the weight of the hub applies its load to the generator rotor flange. Such a hub is accordingly to be rotated from its perpendicular orientation into the desired horizontal orientation in the mounting operation.

Preferably the rotor hub is provided with a hub casing and the handling apparatus is so adapted that the hub casing is not damaged in the rotary movement from the perpendicular orientation into the horizontal orientation. In particular the handling apparatus is such that the hub casing does not have any contact with the ground or base surface on which it stands, and it has no contact with the lifting unit which is fixed to the fixing portion while the rotor hub is rotated from its perpendicular orientation into the horizontal orientation. In particular the fixing portion is of such a configuration that it can be reached directly by the lifting unit of the crane, both in the horizontal and also in the perpendicular orientation, and in the transitional region between those two orientations. In addition the handling apparatus is so designed that, when the rotor hub is rotated from the perpendicular to the horizontal orientation, the rotor hub bears with a part of the handling apparatus against a ground or base surface in such a way as to ensure a suitable distance between the hub casing and that base surface. In that case the base surface can also form the support surface on the transport vehicle or another support frame structure on which the rotor hub is prepared on site.

Preferably, besides the handling apparatus, the rotor hub includes a slip ring body for the transmission of electric signals between the rotor hub and the pod and/or a spinner cap. The slip ring body and/or the spinner cap are thus pre-installed. They are installed at the same time as the handling apparatus on the rotor hub and are already present when the rotor hub is rotated. The use of a rotor hub with handling apparatus permits that pre-installation because in particular the difficult rotary movement of the rotor hub from the perpendicular into the horizontal orientation is so well prepared and previously established that such pre-installed elements do not run any risk of suffering damage.

In addition it is therefore also possible for the rotor hub to be provided with a complete casing, that is to say a rotor hub casing including spinner cap, namely the foremost part of the casing which is arranged at the tip of the rotor hub. With such a completely pre-installed casing on the rotor hub, it is already protected from the influences of weather upon being delivered so that further elements including the above-mentioned slip ring body can be pre-installed without being exposed to the weather.

It is also proposed that a handling apparatus according to claim 8 is provided. Such a handling apparatus is intended for use with a rotor hub so that the handling apparatus is to be installed on the rotor hub so that this therefore gives a rotor hub as was described hereinbefore in at least one of the embodiments.

In addition there is proposed a transport vehicle having a handling apparatus as was described hereinbefore. In that case the handling apparatus can be arranged on the transport vehicle, in the manner of a load, or it can be part of the transport vehicle. In particular it is proposed that the transport vehicle has a transport hinge portion which co-operates with the hinge portion of the handling apparatus for guiding the rotary movement of the rotor hub. That provides that the rotor hub is made ready with its handling apparatus on the transport vehicle such as for example a flat-bed truck and in the lifting operation there is a pivotal hinge which provides for a guided pivotal movement between the handling apparatus and the transport vehicle and thus provides a guided pivotal movement between the rotor hub and the transport vehicle. The transport vehicle can be both an ordinary on-road transport vehicle and also a special transport vehicle which is used only for transporting the rotor hub and possibly other components of the wind power installation from a nearby temporary final production location to the erection site. In an embodiment such a transport vehicle is a rail vehicle or a tracked vehicle.

There is also proposed a method of mounting a rotor hub of a wind power installation according to claim 11. That method includes the steps:

providing a rotor hub in a perpendicular orientation with perpendicular hub axis, fixing a lifting unit of a crane at a fixing portion of a lifting apparatus of the rotor hub, lifting the rotor hub directly out of the perpendicular orientation in such a way that upon being lifted the rotor hub rotates out of the perpendicular orientation into a horizontal orientation with horizontal hub axis, and mounting the rotor hub to a pod arranged on a pylon or mast.

That proposes a mounting solution which can be handled well.

Preferably such a method of mounting the rotor hub uses a rotor hub as was described hereinbefore in at least one of the embodiments. Preferably in that respect a slip ring body, a spinner cap and/or a hub casing is pre-installed.

BRIEF DESCRIPTION OF THE SEVERAL VIEWS OF THE DRAWINGS

The invention is described in greater detail hereinafter by way of example by means of embodiments with reference to the accompanying Figures.

Hereinafter identical references can denote similar but not identical elements to increase understanding of the functionality. The Figures can show the same components on differing scales.

DETAILED DESCRIPTION

Figure 1:
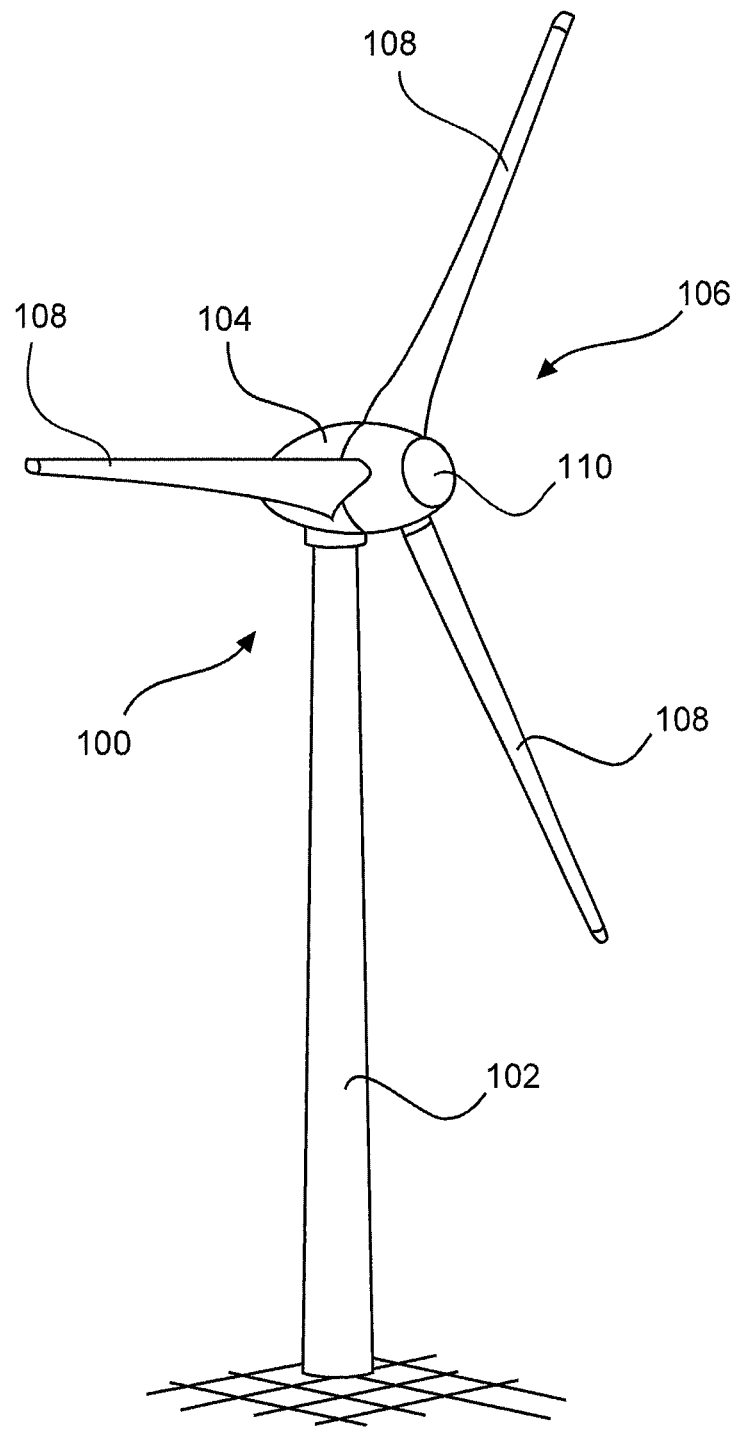
FIG. 1 shows a perspective view of a wind power installation.

FIG. 1 shows a wind power installation 100 with a pylon 102 and a pod 104. Arranged on the pod 104 is a rotor 106 having three rotor blades 108 and a spinner 110. In operation the rotor 106 is caused to rotate by the wind and thereby drives a generator in the pod 104.

Figure 2:
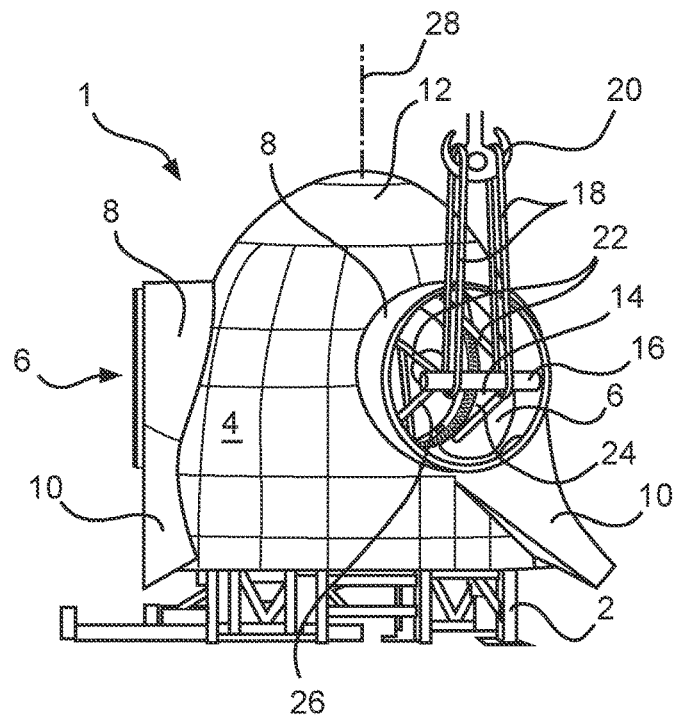
FIG. 2 shows a rotor hub in a perpendicular orientation on a pre-mounting support frame and with fixed lifting unit of a crane.

FIG. 2 shows a rotor hub 1 which is mounted on a pre-mounting support frame 2 which forms a part of a handling apparatus for handling the rotor hub 1. In this case the rotor hub 1 is provided with a hub casing or rotor hub casing 4. The rotor hub 1 is intended for use with a wind power installation having three rotor blades. Accordingly the hub casing 4 also has three rotor blade openings 6, of which one can be clearly seen. Of a further rotor blade opening 6, it is possible to see a side view of a case portion 8 surrounding the opening. In addition a rotor blade attachment 10 is associated with each rotor blade opening 6 and each opening case portion 8. That rotor blade attachment 10 is part of the hub casing and is however intended to appropriately correspond to an inserted rotor blade.

The rotor hub 1 also already has a spinner cap 12 fitted thereon, which completes the hub casing 4.

A fixing portion 14 can be substantially seen in one of the rotor blade openings 6. The fixing portion 14 has a carrier strut 16 for fixing a lifting unit 18. The lifting unit 18 is suspended from a crane hook 20 and passes around the carrier strut 16.

The fixing portion 14 and therewith also the carrier strut 16 are fixed to a ring flange 24 of the hub 1 by way of a fixing structure 22. The fixing portion 14 extends from the ring flange 24 which is a blade connection for fixing a rotor blade, by means of the fixing structure 22 which has substantially four fixing struts 26, through the rotor blade opening 6 of the hub casing 4 so that the carrier strut 16 is arranged just outside the hub casing, namely outside the one rotor blade opening 6. The lifting unit 18 is fixed directly in that position and extends perpendicularly from the crane hook to the carrier strut 16. In that case the lifting unit 18 does not touch or does not substantially touch the hub casing 4 and thereby avoids damage to the casing in that portion by the crane, in particular by the lifting unit 18.

The position shown in FIG. 2 illustrates a perpendicular orientation of the rotor hub 1 and thus its hub axis 28. That position basically forms the starting position after delivery of the rotor hub 1 before the rotor hub 1 is lifted by a crane. Subsequent lifting with rotation of the rotor hub 1 is thus prepared by the fixing portion 14 and the pre-mounting support frame 2. The pre-mounting support frame 2 provides for a large part of the subsequent rotary movement and can therefore also be referred to as a lifting device. In that respect the pre-mounting support frame can also be referred to as an erecting device or a part of the erecting device.

Figure 3:
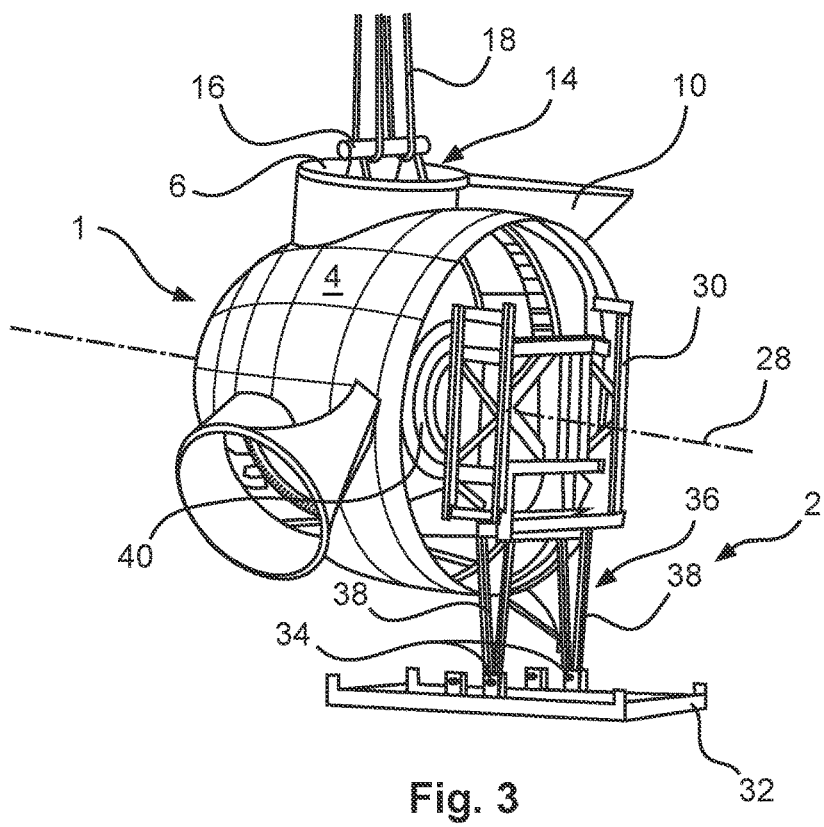
FIG. 3 shows a rotor hub in a horizontal orientation which is rotated relative to that shown in FIG. 2.

FIG. 3 shows the rotor hub 1 in an orientation of being lifted by the mounting crane. In this case the hub axis 28 is approximately horizontal. A deviation from a horizontal orientation of the hub axis 28 is so slight that the illustrated orientation can always still be referred as an orientation with a substantially horizontal hub axis 28. It is to be noted that the apparent inclined position of the hub axis 28 in FIG. 3 is in part also due to the perspective view selected, or also due to the pre-set axis angle of the installation.

It will be seen from FIG. 3 that the fixing portion 14 projects with its carrier strut 16 completely out of the hub casing 4 and thus out of the rotor blade opening 6. The rotor hub 8 is thus rotated from the perpendicular orientation in FIG. 2 into the horizontal orientation in FIG. 3 without the lifting unit 18 coming into contact with the hub casing 4.

FIG. 3 clearly shows that the pre-mounting support frame 2 has a hub support frame 30 and a carrier frame 32. The hub support frame 30 is mounted pivotably by means of a hinge portion 34 to the carrier frame 32. In the illustrated embodiment, the hinge portion 34 has two individual hinges. Upon being lifted out of the perpendicular orientation shown in FIG. 2 the rotor hub 1 is supported by means of the pre-mounting support frame 2 on the ground or base surface, by the hub support frame 30 being fixed to the rotor hub 1 and guiding a pivotal movement by means of the hinge portion 34.

The illustrated embodiment includes the fixing portion 16 and the pre-mounting support frame 2 with the hub support frame 30 and the carrier frame 32. In principle the fixing portion can also be part of a rotor hub. In an embodiment the carrier frame 32 can be provided as a separate element on which the hub support frame 30 or a similar hub support frame is supported. For example the carrier frame 32 can be part of a transport vehicle, in particular part of a special transport vehicle which basically is not intended for travel on public roads.

The rotary movement from the perpendicular orientation in FIG. 2 into the horizontal orientation in FIG. 3 uses the hinge portion 34. In that case the hub support frame 30 and therewith the pre-mounting support frame 2 and therewith the handling apparatus overall has a projecting structure 36 having two side arms 38. The side arms 38 and thus the projecting structure 36 project transversely relative to the hub axis 28 beyond the hub casing 4. In that way the rotary movement from the perpendicular orientation in FIG. 2 into the horizontal orientation in FIG. 3 can be effected solely by lifting the rotor hub 1 at the fixing portion 14 without the mounted hub casing 4 suffering damage in that case.

The hub support frame 30 is fixed to a generator rotor flange 40 and is released in the partially lifted situation as shown in FIG. 3. The generator rotor flange 40 is then free and can serve to fix the rotor hub 1 to a corresponding counterpart flange in the pod of the wind power installation to be installed. The fixing portion 14 can be removed as soon as the rotor hub 1 is firmly fixed to the wind power installation to be erected, in particular to a corresponding generator rotor. The fixing portion 14 can also be interpreted as an element separate from the handling apparatus.

Figure 4:
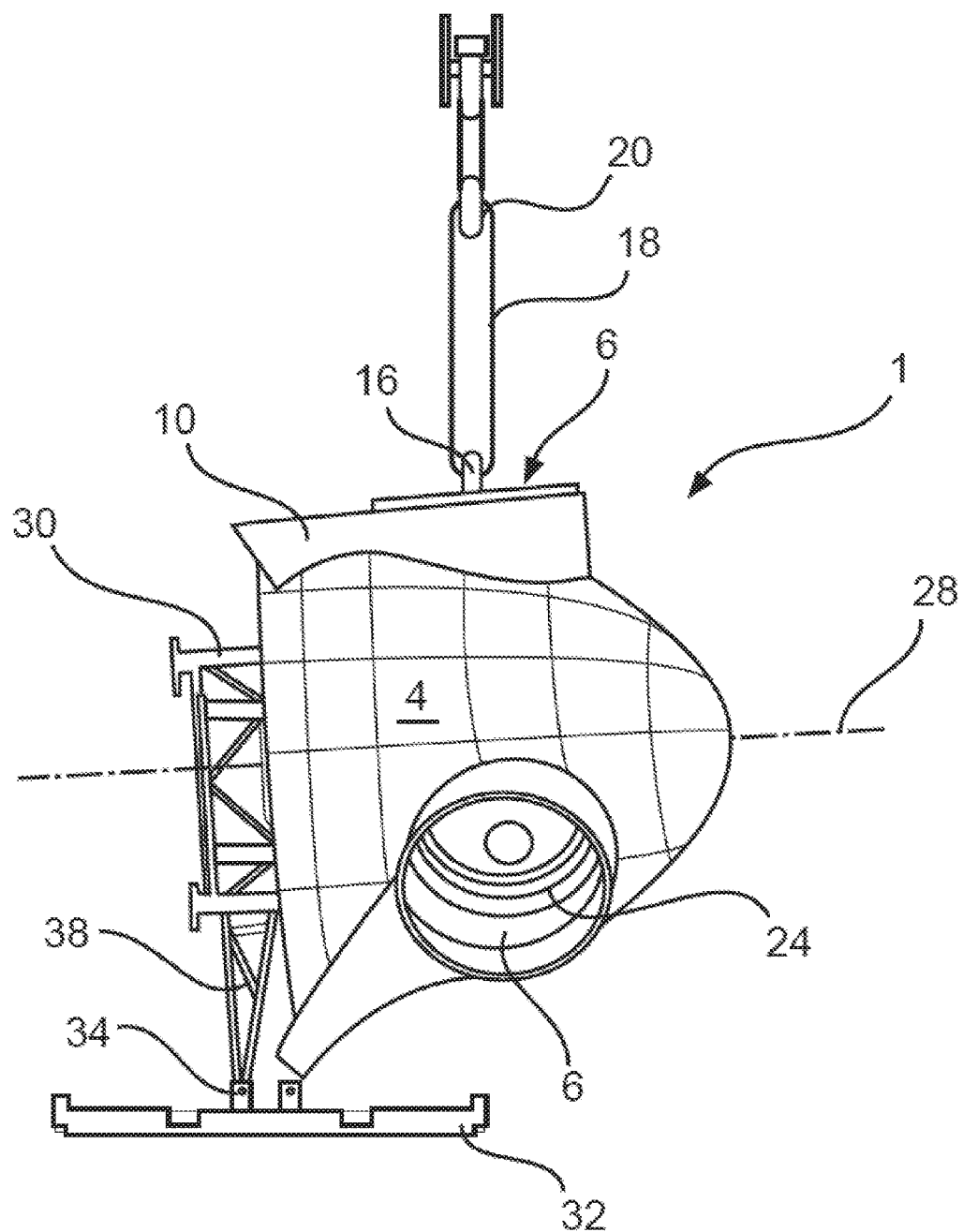
FIG. 4 shows a rotor hub in a horizontal orientation as shown in FIG. 3 but as another perspective.

Finally FIG. 4 shows a rotor hub 1 in the FIG. 3 orientation. That orientation can also be referred to as the mounting position.

Thus there is proposed a handling apparatus which can also be referred to as an erecting apparatus which provides that the rotor hub rotates upon being lifted from a perpendicular orientation or position into a mounting position with the hub axis substantially horizontal. For that purpose a fixing portion is fixed to the ring flange of a blade connection or to the blade flange mounting, wherein that fixing portion can also be referred to as a lifting apparatus. The handling apparatus thus includes a support frame having a carrier frame 32 which for example can be placed on a flat-bed truck, and with a pivotably connected hub support frame 30 which is fixed to the rotor hub 1. In particular a rotor hub 1 is produced in a temporary production workshop which can also be referred to as a minifactory, on an area for a planned wind park. That production includes the arrangement of the hub casing. Prepared in that way, the hub is delivered to the respective wind power installation to be erected. When the lifting apparatus is lifted the hub then rotates directly into its installation position.

There is thus provided a solution which simplifies the installation of a wind power installation, in particular installation of the rotor hub. In particular the rotor hub can be pre-mounted on a support frame, including casing portions. The mounting support frame or hub support frame is connected to a carrier frame, in particular by way of a hinge connection. A lifting apparatus is mounted to a fixing portion and/or to a blade flange mounting. A mounting crane lifts the rotor hub at the lifting apparatus and in that case the rotor hub rotates into the mounting position by way of the erecting apparatus.

After the mounting position is reached the pre-mounting support frame is released and the mounting crane can then further lift the rotor hub. After mounting of the rotor hub has been effected the lifting apparatus is in any case disconnected.

Particular advantages are that the rotor hub can be completely pre-mounted, at any event very many elements can be pre-mounted. That reduces crane lifts. For example there is no need for a further installation step with a corresponding crane lift for mounting a hub casing or a part thereof or a slip ring body. Accordingly it is also possible to reduce mounting times with a mounting crane, with corresponding savings. In addition quality can be improved by pre-mounting on the ground.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rotor hub of a wind power installation, the rotor hub comprising:
   a handling apparatus for lifting the rotor hub using a crane for mounting the rotor hub to a pod arranged on a wind power installation pylon, the handling apparatus comprising a pre-mounting support frame including a hub support frame pivotably mounted to a carrier frame by a hinge portion,
   wherein the hub support frame is coupled to the rotor hub,
   wherein the pre-mounting support frame supports the rotor hub such that the carrier frame and rotor hub are in a first position, wherein in the first position the rotor hub has not been lifted and is in a perpendicular orientation with a substantially perpendicular hub axis, and
   wherein the handling apparatus is adapted so that as the handling apparatus and the rotor hub are lifted, the rotor hub and the hub support frame rotate about the hinge portion from the first position into a second position,
   wherein when the rotor hub is in the second position, the rotor hub has a horizontal orientation with a substantially horizontal hub axis,
   wherein when the rotor hub is in the second position, the carrier frame remains in the first position.

2. The rotor hub according to claim 1 further comprising at least one blade connection having a ring flange for fixing a rotor blade to the rotor hub and a hub casing having at least one rotor blade opening for a rotor blade to pass through, wherein a fixing portion of the handling apparatus is fixed to the ring flange and extends through the rotor blade opening.

3. The rotor hub according to claim 1 wherein the pre-mounting support frame is fixed to a generator rotor flange arranged concentrically relative to the hub axis.

4. The rotor hub according to claim 1 wherein the rotor hub is adapted to be connected to a rotor of a generator of a gearless wind power installation.

5. The rotor hub according to claim 1 wherein the rotor hub is provided with a hub casing and the handling apparatus is designed so that the hub casing is not damaged during the rotation from the perpendicular orientation into the horizontal orientation.

6. A handling apparatus for lifting a rotor hub using a crane for mounting the rotor hub to a pod arranged on a wind power installation pylon, the handling apparatus comprising:
   a fixing portion in a rotor blade opening of the rotor hub; and
   a support frame including at least one hinge that rotatably couples the rotor hub to the support frame, the support frame being configured to cause the rotor hub to rotate from a perpendicular orientation with a substantially perpendicular hub axis into a horizontal orientation with a substantially horizontal hub axis in response to the fixing portion being lifted by a lifting unit of a crane, wherein the support frame does not rotate, and when the rotor hub is in the perpendicular orientation the support frame supports the rotor hub,
   wherein the at least one hinge guides the rotation of the rotor hub from the perpendicular orientation into the horizontal orientation.

7. The handling apparatus according to claim 6 wherein the support frame is located under the rotor hub.

8. The handling apparatus according to claim 6 wherein the handling apparatus is located on a transportation vehicle.

9. The handling apparatus according to claim 6 wherein the fixing portion includes a carrier strut and the lifting unit that passes over the carrier strut.

10. A method of mounting a rotor hub of a wind power installation, the method comprising:
    providing a rotor hub and a carrier frame in a first position, wherein the rotor hub in the first position has a perpendicular orientation with a substantially perpendicular hub axis, the rotor hub being supported by a pre-mounting support frame while the rotor hub is in the first position, the pre-mounting support frame including a hub support frame pivotably mounted to the carrier frame by a hinge portion,
    fixing a lifting unit of a crane at a fixing portion of a lifting apparatus of the rotor hub,
    lifting the rotor hub such that the lifting of the rotor hub causes the rotor hub and the hub support frame to rotate from the first position into a second position, wherein the rotor hub in the second position has a horizontal orientation with a substantially horizontal hub axis, wherein the lifting causes the hub support frame to rotate along with the rotor hub about the hinge portion such that the carrier frame remains in the first position, and
    mounting the rotor hub to a pod arranged on a pylon or mast.

11. The method according to claim 10 further comprising installing at least one of a slip ring body, a spinner cap, and a hub casing in the rotor hub prior to lifting the rotor hub.

12. The method according to claim 10 wherein lifting the rotor hub comprises rotating the rotor hub relative to the carrier frame.

13. The method according to claim 12 wherein the carrier frame remains still while the rotor hub rotates from the perpendicular orientation to the horizontal orientation.

14. The method according to claim 10 further comprising removing the carrier frame prior to mounting the rotor hub to the pod.

* * * * *